US010698257B2

(12) United States Patent
Richards et al.

(10) Patent No.: US 10,698,257 B2
(45) Date of Patent: Jun. 30, 2020

(54) LIQUID CRYSTAL DISPLAY BACKLIGHT UTILIZING REFLECTIVE STACK

(71) Applicant: Facebook Technologies, LLC, Menlo Park, CA (US)

(72) Inventors: Evan M. Richards, Santa Clara, CA (US); Shizhe Shen, San Mateo, CA (US); Jianru Shi, Union City, CA (US); Yue Shi, Santa Clara, CA (US); Shie Ping Jeffrey Tseng, Los Altos, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 56 days.

(21) Appl. No.: 15/461,323

(22) Filed: Mar. 16, 2017

(65) Prior Publication Data

US 2018/0267361 A1 Sep. 20, 2018

(51) Int. Cl.
*G02F 1/1335* (2006.01)
*G02F 1/13357* (2006.01)
*G02B 27/01* (2006.01)
*G02F 1/13363* (2006.01)

(52) U.S. Cl.
CPC ... *G02F 1/133605* (2013.01); *G02B 27/0172* (2013.01); *G02F 1/133536* (2013.01); *G02F 1/13362* (2013.01); *G02F 1/133606* (2013.01); *G02F 2001/13355* (2013.01); *G02F 2001/133567* (2013.01); *G02F 2001/133638* (2013.01)

(58) Field of Classification Search
CPC ......... G02F 1/133605; G02F 1/133536; G02F 2001/133638; G02F 2001/13355; G02F 2001/133567; G02F 1/133606; G02F 1/13362; G02B 27/0172
See application file for complete search history.

(56) References Cited

U.S. PATENT DOCUMENTS

| | | | |
|---|---|---|---|
| 9,766,464 B2 * | 9/2017 | Poon | G02B 27/0172 |
| 10,088,685 B1 * | 10/2018 | Aharoni | G02B 27/0172 |
| 2010/0177113 A1 * | 7/2010 | Gay | G02B 27/2214 345/589 |
| 2016/0299341 A1 * | 10/2016 | Yoshida | G02F 1/13439 |

* cited by examiner

*Primary Examiner* — Paisley L Wilson
(74) *Attorney, Agent, or Firm* — Fenwick & West LLP

(57) ABSTRACT

A liquid crystal display (LCD) device including an LCD panel and a backlight. The backlight includes a plurality of light sources to emit light, and a reflective stack. The reflective stack is positioned to receive light emitted from the light sources and transmit the light to the LCD panel. The reflective stack includes optical elements providing a folded beam path for the light emitted from the light sources to the LCD panel. The light emitted from the light sources is diffused while propagating towards and away from the LCD panel along the folded beam path. The folded beam path has an optical distance that is longer than the spatial distance between the light sources and the LCD panel to improve light diffusion by the backlight without substantially increasing backlight thickness.

14 Claims, 7 Drawing Sheets

LIQUID CRYSTAL DISPLAY BACKLIGHT UTILIZING REFLECTIVE STACK

BACKGROUND

A liquid crystal display (LCD) device includes a LCD panel and a backlight that provides illumination to pixels of the LCD panel. For example, the backlight may be an edge-lit backlight that uses light emitting diodes (LEDs) arranged along an edge of a light guide. In another example, the backlight may be a direct-lit backlight that uses a matrix of LEDs arranged behind the LCD panel. The spatial separation between the LEDs can result in non-uniformity of illumination for the pixels of the LCD panel.

SUMMARY

A liquid crystal display (LCD) device including an LCD panel and a backlight. The backlight includes a plurality of light sources to emit light, and a reflective stack. The reflective stack is positioned to receive light from the light sources and transmit light to the LCD panel, such as between the plurality of light sources and the LCD panel. The reflective stack includes optical elements providing the folded beam path for the light emitted from the plurality of light sources to the LCD panel. In some embodiments, the reflective stack reflects a portion of the light received from the light sources. The backlight further includes a recycling stack that reflects the light from the reflective stack back towards the reflective stack and along the folded beam path. In some embodiments, the reflective stack outputs linearly polarized light aligned along a polarization axis of a LCD input polarizer of the LCD panel. As such, the efficiency of light extraction from the light sources of the backlight to the pixels of the LCD panel is improved.

Some embodiments include a head-mounted display (HMD) including an LCD device including a backlight with a reflective stack and/or a recycling stack. Some embodiments include a backlight having a reflective stack and/or a recycling stack.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Techniques for providing a backlight optimized for head-mounted displays (HMD) are discussed herein. The backlight includes light sources that emit light to illuminate pixels of the LCD panel. The backlight also includes a reflective stack that provides a folded beam path for the light emitted from the light sources to the LCD panel. The folded beam path has an optical distance that is longer than the spatial distance between light sources and the LCD panel. The light is diffused while propagating through the folded beam path. As such, light diffusion and illumination uniformity to the pixels of the LCD panel are improved without substantially increasing backlight thickness. The backlight may also include a recycling stack that reflects light from the light sources that are not initially transmitted through the reflective stack back towards the reflective stack and along the folded beam path.

System Overview

Figure 1:
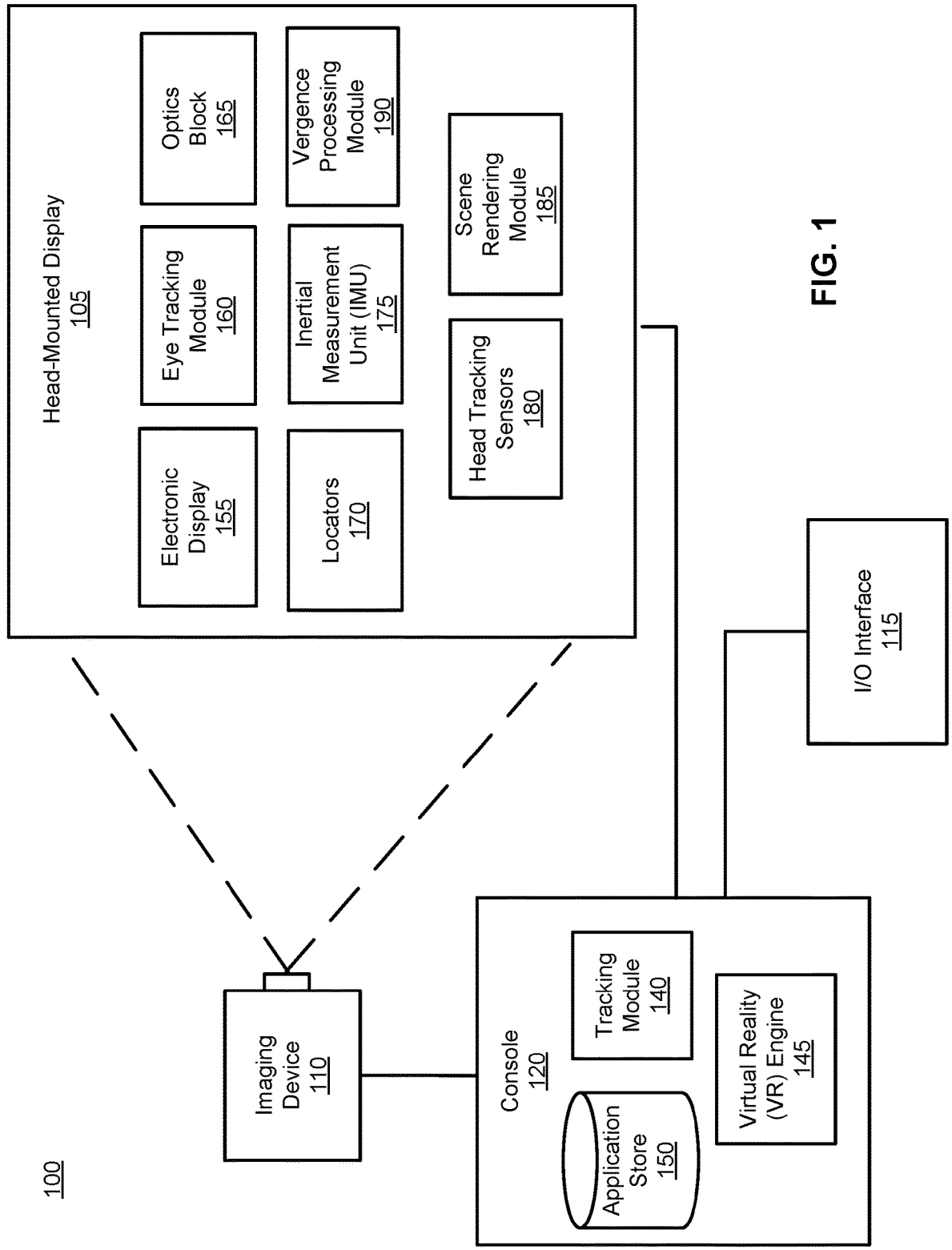
FIG. 1 shows a system, in accordance with some embodiments.

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and a I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, a scene rendering module 185, and a vergence processing module 190.

The electronic display 155 includes an LCD device including a LCD panel and a backlight. The backlight includes a plurality of light sources positioned to emit light toward the LCD panel to illuminate the pixels of the LCD panel. As discussed in greater detail below, the backlight includes optical elements such as a reflective stack that improves uniformity of illumination to the pixels of the LCD panel and a recycling stack that improves light extraction efficiency. The reflective stack may be disposed between the light sources and the LCD panel to cause light emitted from the light sources to take a folded beam path to the LCD panel. The light emitted from the light sources is diffused while propagating towards and away from the LCD panel along the folded beam path. As such, the reflective stack reduces the occurrence of hot spots, and improves uniformity of illumination to the pixels of the LCD panel. Furthermore, the folded beam path is an optical distance that is longer than the spatial distance between the light sources and the LCD panel, thereby improving the light diffusion for the backlight without substantially increasing thickness.

The optics block 165 adjusts its focal length responsive to instructions from the console 120. In some embodiments, the optics block 165 includes a multi multifocal block to adjust a focal length (adjusts optical power) of the optics block 165

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 190, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 175 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g. information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 165 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
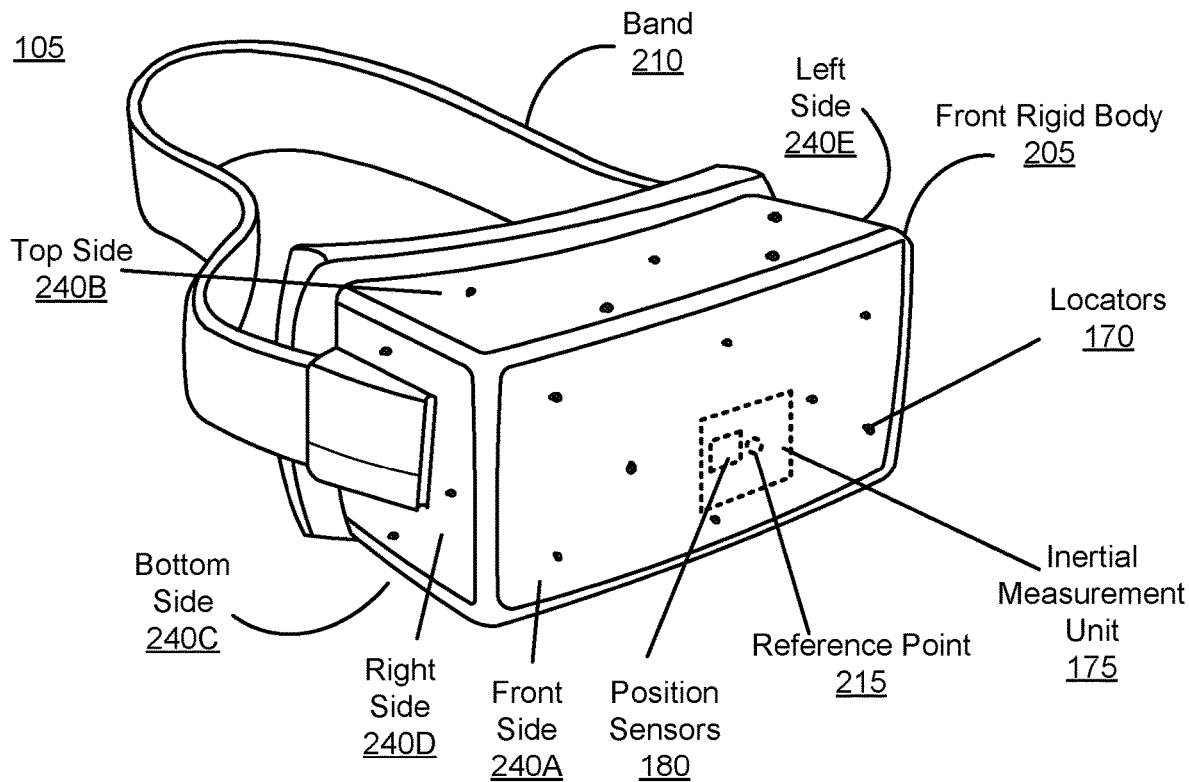
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
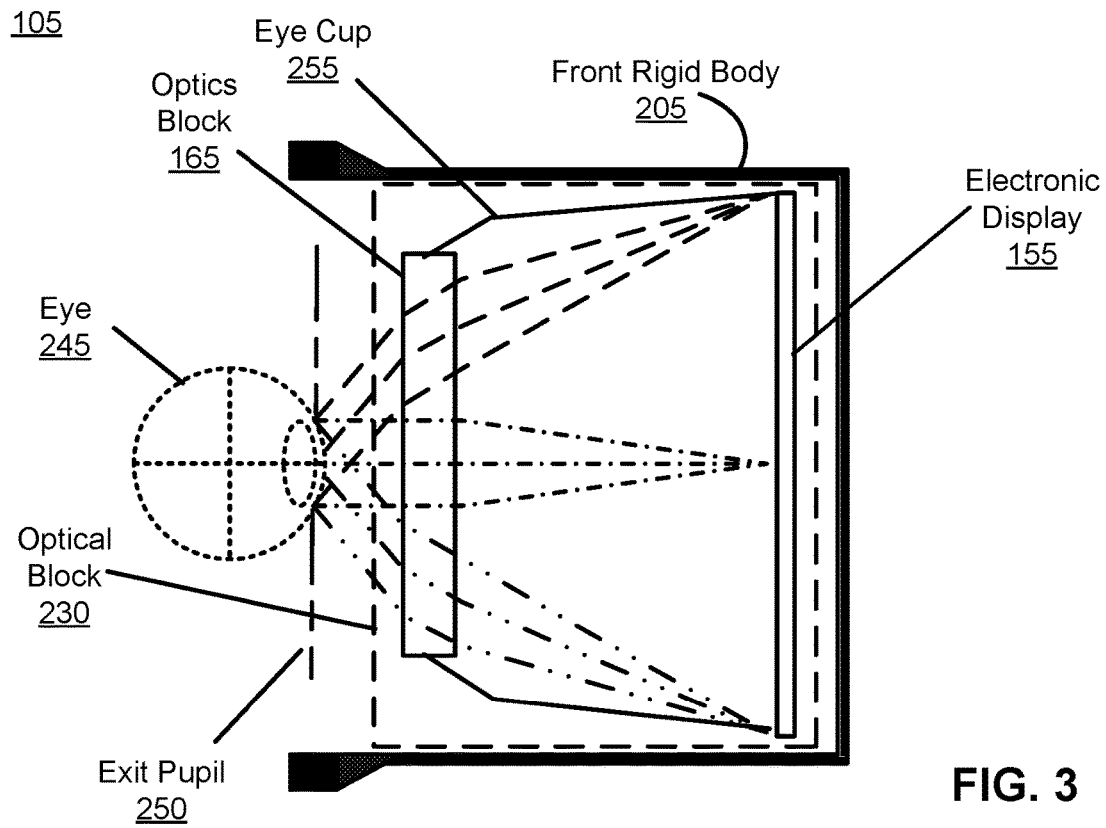
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes an optical block 230 that provides altered image light to an exit pupil 250. The exit pupil 250 is the location in the front rigid body 205 where a user's eye 245 is positioned. For purposes of illustration, FIG. 3 shows a cross section associated with a single eye 245, but the HMD 105 may include another optical block that provides altered image light to another eye of the user.

The optical block 230 includes the electronic display 155, the optics block 165, and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 164 directs the image light to the exit pupil 250 for presentation to the user. In some embodiments, the optics block 165 and the eye cone 255 may be omitted from the optical block 230.

Figure 4:
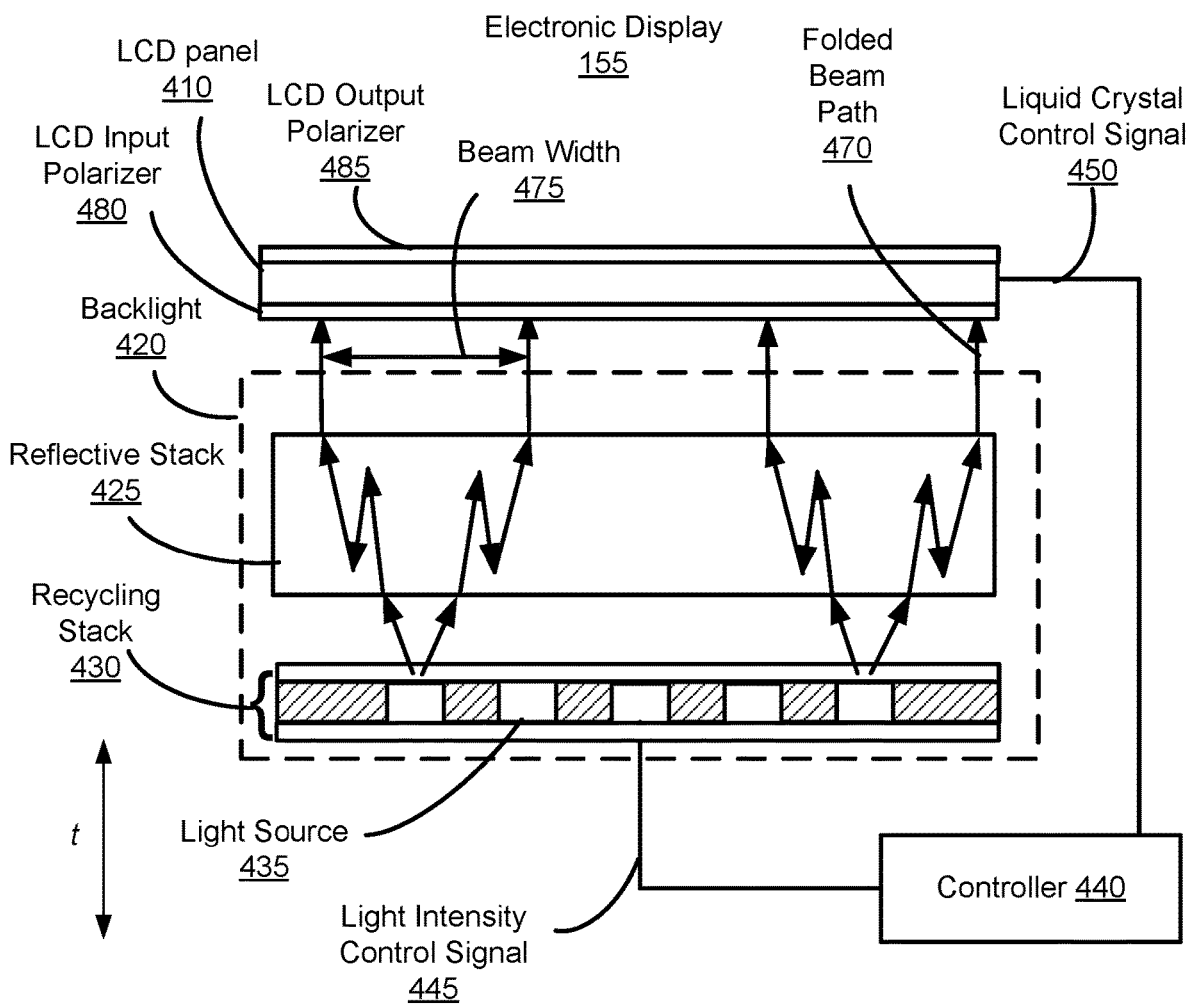
FIGS. 4 through 7 show cross sectional side views electronic display, in accordance with some embodiments.

FIG. 4 shows a cross sectional side view of an electronic display 155. Although the HMD 105 may include various types of displays, the electronic display 155 in this embodiment is a LCD device including a liquid crystal display (LCD) panel 410, a backlight 420, and a controller 440. The backlight 420 emits light towards the exit pupil 250 through the LCD panel 410. The LCD panel 410 is disposed between the backlight 420 and the exit pupil 250, and controls an amount of light from the backlight 420 to pass through on a per pixel basis. A space between the LCD panel 410 and the backlight 420 may be vacuum or filled with transparent material. In other embodiments, the electronic display 155 includes different, or fewer components than shown in FIG. 4.

The backlight 420 includes a reflective stack 425, a recycling stack 430, and light sources 435 that generate light. The light sources 435 in this embodiment are arranged in a (e.g., 2 dimensional) matrix behind the LCD panel 410 along a thickness dimension t to emit light towards the LCD panel 410. The light sources 435 may be light emitting diodes (LEDs) that emit white light. In some embodiments, the light sources 435 may include LEDs of different color or spectrum intensities (e.g., R, G, and B) that can be separately controlled and optimized to desired spectrum intensities and emission response times. The light sources 435 are arranged in a matrix behind the reflective stack to emit light directly toward the reflective stack 425. In some embodiments, the light sources 435 provide edge-lighting rather than direct lighting. The light sources 435 may be located along one or more edges of a light guide. The light guide receives light emitted from the light sources in a first direction and reflects the light in a second direction toward the reflective stack 425.

The reflective stack 425 includes optical elements, as discussed in greater detail below in connection with FIGS. 5 and 6, which cause light emitted from the light sources 435 to take a folded beam path 470 from the light sources 435 to the LCD panel 410. As the light propagates along the folded beam path 470, which includes light propagation in the thickness dimension t towards and away from the LCD panel 410 within the reflective stack 410, the light is diffused. The beam width 475 of the diffused light from the light sources 435 is increased at LCD panel 410, which results in a reduction of light concentration and larger beam widths at points of the LCD panel 410 (e.g., directly behind a light sources 435). As such, the reflective stack 425 reduces the occurrence of hotspots and provides more uniform pixel illumination across the LCD panel 410 by the light sources 435. In some embodiments, a light diffuser or space (along dimension t) may be placed between the light sources 435 and the LCD panel 410 instead of a reflective stack to provide a longer beam path. However, use of a diffuser or spatial separation alone results in a thicker electronic display 155 and reduced light diffusion relative to use of the reflective stack 425.

The reflective stack 425 receives unpolarized light from the light sources 435 and outputs a linearly polarized light that is matched to the LCD panel 410 to optimize light transmission efficiency from the light sources 435 to the LCD panel 410. The LCD panel 410 includes a LCD input polarizer 480 and a LCD output polarizer 485. The polarizers 480 and 485 are linear polarizers having polarization axes oriented tangential to each other. Linear polarized light from the reflective stack 425 having the same orientation as the polarization axis of the LCD input polarizer 480 passes through the LCD input polarizer 480, and then through liquid crystal layers of the LCD panel 410. The liquid crystal layers rotate the polarization of the light based on states of the liquid crystals as controlled by the liquid crystal control signal 450 from the controller 440. The LCD output polarizer 485 blocks the rotated light from the liquid crystal layers based on the relative angle between the polarization axis of the LCD output polarizer 485 and the rotated light from the liquid crystal layers. The reflective stack 425 converts unpolarized light from the light sources 435 into linearly polarized light oriented along the polarization axis of the LCD input polarizer 480.

The recycling stack 430 includes optical elements, as discussed in greater detail below in connection with FIG. 7, which cause light reflected from the reflective stack 425 toward the light sources 435 to be reflected back toward the reflective stack 425. The reflective stack 425 receives unpolarized light from the light sources 435, and transmits a portion of the light (e.g., having a linear polarization oriented along a polarization axis of a linear polarizer) and reflects a portion of the light. The reflected portion of light propagates to the recycling stack 430, which converts the light into an orientation that can be transmitted through the reflective stack, and directs the converted light towards the reflective stack 425 as recycled light. The reflective stack 425 causes the recycled light to take a folded beam to the LCD panel 410. In some embodiments, the recycling stack 430 is separated from the reflective stack 425 by an air gap.

The intensity (e.g. over time) of light from a light source 435 is adjusted according to a light intensity control signal 445 from the controller 440. In some embodiments, the backlight 420 may be a strobed backlight where light sources 435 are switched on and off over time (e.g., according to a duty cycle). The light intensity control signal 445 is a signal indicative of intensity of light to be output for each light source 435. The controller 440 also provides a liquid crystal control signal 450 to the LCD panel 410 to control an amount of light to be passed through a liquid crystal layer of the LCD panel 410 for different pixels.

Figure 5:
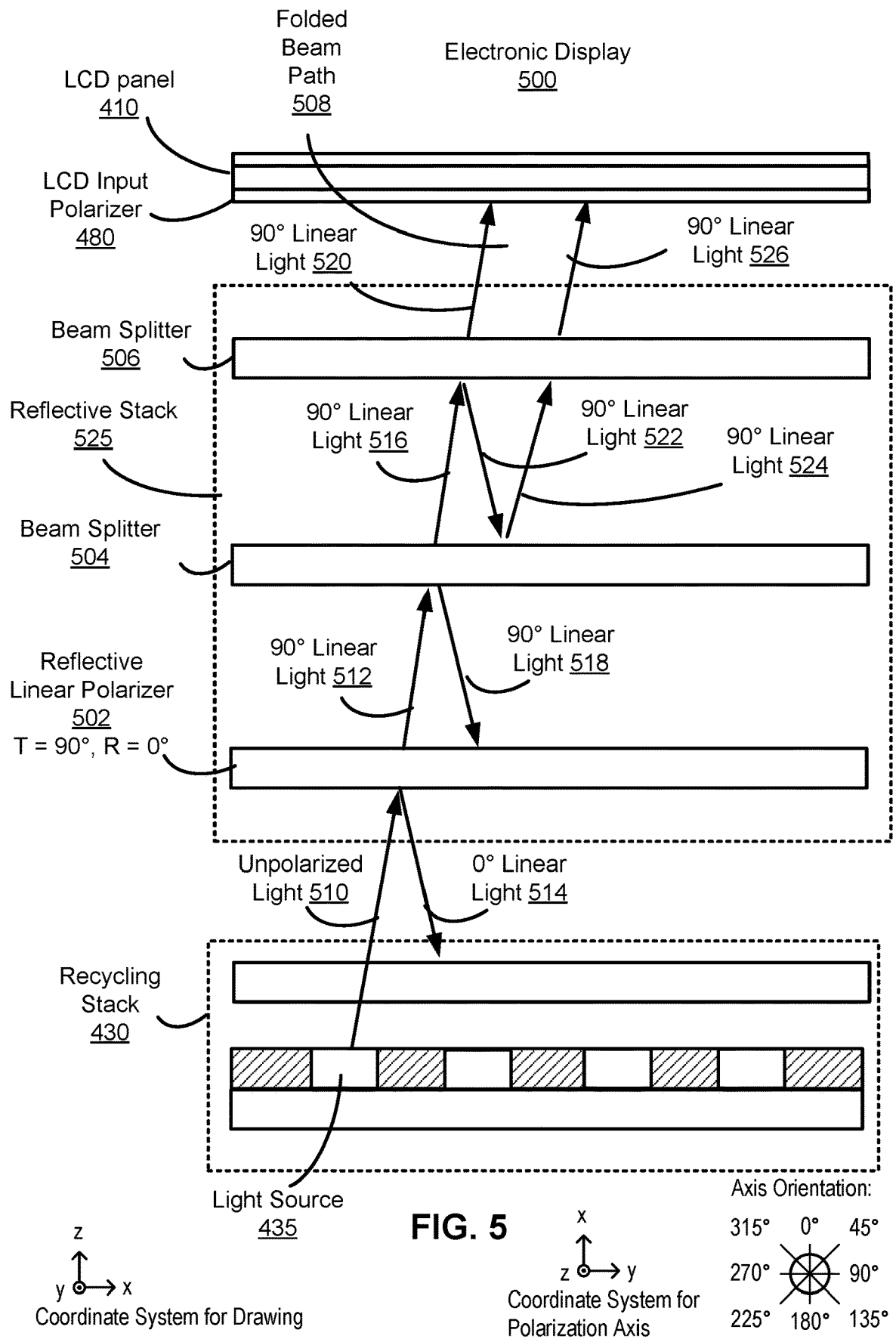

FIG. 5 shows a cross sectional side view of the electronic display 500 including a reflective stack 525, in accordance with some embodiments. The electronic display 500 is an example of an electronic display 155 that can be incorporated within a HMD. The electronic display 500 includes an LCD panel 410 and a backlight including the reflective stack 525, recycling stack 430, and light sources 435.

The reflective stack 525 includes optical elements having axes that are aligned relative to each other to provide a folded beam path 508. The axis orientation shown in FIG. 5 provides a reference for the relative alignments discussed herein. The reflective stack 525 includes a reflective linear polarizer 502, a beam splitter 504, and a beam splitter 506. The reflective linear polarizer 502 linearly polarizes light in accordance with the orientation of its polarization axis. The reflective linear polarizer 502 passes incident light having an electric field component aligned along the polarization axis, and reflects light having an electric field component aligned orthogonal to the polarization axis. The beam splitters 504 and 506 split incident light into two beams. The beam splitters 504 may be 50:50 beam splitters that divide an incident beam having an electrical field component aligned along an axis into two beams having electric field components aligned along the axis of the incident beam, and traveling in different directions.

The optical elements of the reflective stack 525 causes incident unpolarized light from the light sources 435 to take the folded beam path 508 to the LCD input polarizer 480 of the LCD panel 410. The reflective stack 525 also converts the incident unpolarized light into linearly polarized light having an electric field component aligned with the polarization axis the LCD input polarizer 480. For example, the light source 435 emits unpolarized light 510, which passes through the recycling stack 430 as unpolarized light to the reflective, and to the reflective linear polarizer 502. The reflective linear polarizer 502 has a polarization axis aligned with the polarization axis of the LCD input polarizer 480, which in this example is at 90 degrees. The reflective linear polarizer 502 transmits linearly polarized light 512 having an electric field component aligned along 90 degrees in a direction towards the LCD panel 410. The reflective linear polarizer 502 reflects linearly polarized light 514 having an electric field component aligned at 0 degrees (orthogonal to 90 degrees) in a direction away from the LCD panel 410 and towards the recycling stack 430.

The beam splitter 504 receives the linearly polarized light 512 having the electrical field component aligned along 90 degrees from the reflective linear polarizer 502, and converts the linearly polarized light 512 into linearly polarized light 516 and linearly polarized light 518. The linearly polarized light 516 and 518 each have electric field components aligned along 90 degrees. The beam splitter 504 directs linearly polarized light 516 towards the LCD panel 410, and directs linearly polarized light 518 away from the LCD panel 410 and towards the recycling stack 430.

The beam splitter 506 receives the linearly polarized light 516 having the electrical field component aligned along 90 degrees from the beam splitter 504, and converts the linearly polarized light 516 into linearly polarized light 520 and linearly polarized light 522. The linearly polarized light 520 and 522 each has electric field components aligned along 90 degrees. The beam splitter 506 directs linearly polarized light 520 towards the LCD panel 410, and directs linearly polarized light 522 away from the LCD panel 410 and towards the beam splitter 504.

The linearly polarized light 520 propagates to the LCD input polarizer 480, and to the LCD panel 410. The linearly polarized light 520 has an electric field component aligned with the polarization axis the LCD input polarizer 480.

The beam splitter 504 receives the linearly polarized light 522 having the electrical field component aligned along 90 degrees from the beam splitter 506, and converts the linearly polarized light 522 into linearly polarized light 524 directed towards the beam splitter 506, and a linearly polarized light component (not shown) directed away from the LCD panel 410. The beam splitter 506 receives the linearly polarized light 524 having the electrical field component aligned along 90 degrees from the beam splitter 504, and converts the linearly polarized light 524 into linearly polarized light 526 directed towards the LCD panel 410, and a linearly polarized light component (not shown) directed away from the LCD panel 410.

The linearly polarized light 526 propagates to the LCD input polarizer 480, and to the LCD panel 410. Like the light 520, the linearly polarized light 526 has an electric field component aligned with the polarization axis the LCD input polarizer 480. Although a single reflection of light between the beam splitters 504 and 506 is shown in FIG. 5 (e.g., resulting in the linearly polarized light 526), remaining components of light are repeatedly reflected between the beam splitters 504 and 506. Each reflection results in a portion of remaining light passing through the beam splitter 506 and to the LCD input polarizer 480, and having an electric field component aligned with the polarization axis the LCD input polarizer 480.

In some embodiments, the reflective linear polarizer 502 and beam splitters 504 and 506 of the reflective stack 525 each transmits approximately half of the power of incident light. If the unpolarized light 510 from a light source 435 has a power P, then the linearly polarized light 512 has a power 0.5 P, the linearly polarized light 514 has a power 0.5 P, the linearly polarized light 516 has a power 0.25 P, the linearly polarized light 516 has a power 0.125 P, the linearly polarized light 518 has a power 0.125 P, the linearly polarized light 520 has a power 0.125 P, the linearly polarized light 522 has a power 0.125 P, the linearly polarized light 524 has 0.0625 P, and the linearly polarized light 526 has 0.03125 P. A first order estimate of net power to the LCD input polarizer 480 from the reflective stack 525 (including light contributions from the recycling stack 435 as discussed in connection with FIG. 7) is 0.2815 P. In some embodiments, power transmission properties of the beam splitters 504 and 506 can be varied based on angle of incidence and/or wavelength.

Figure 6:
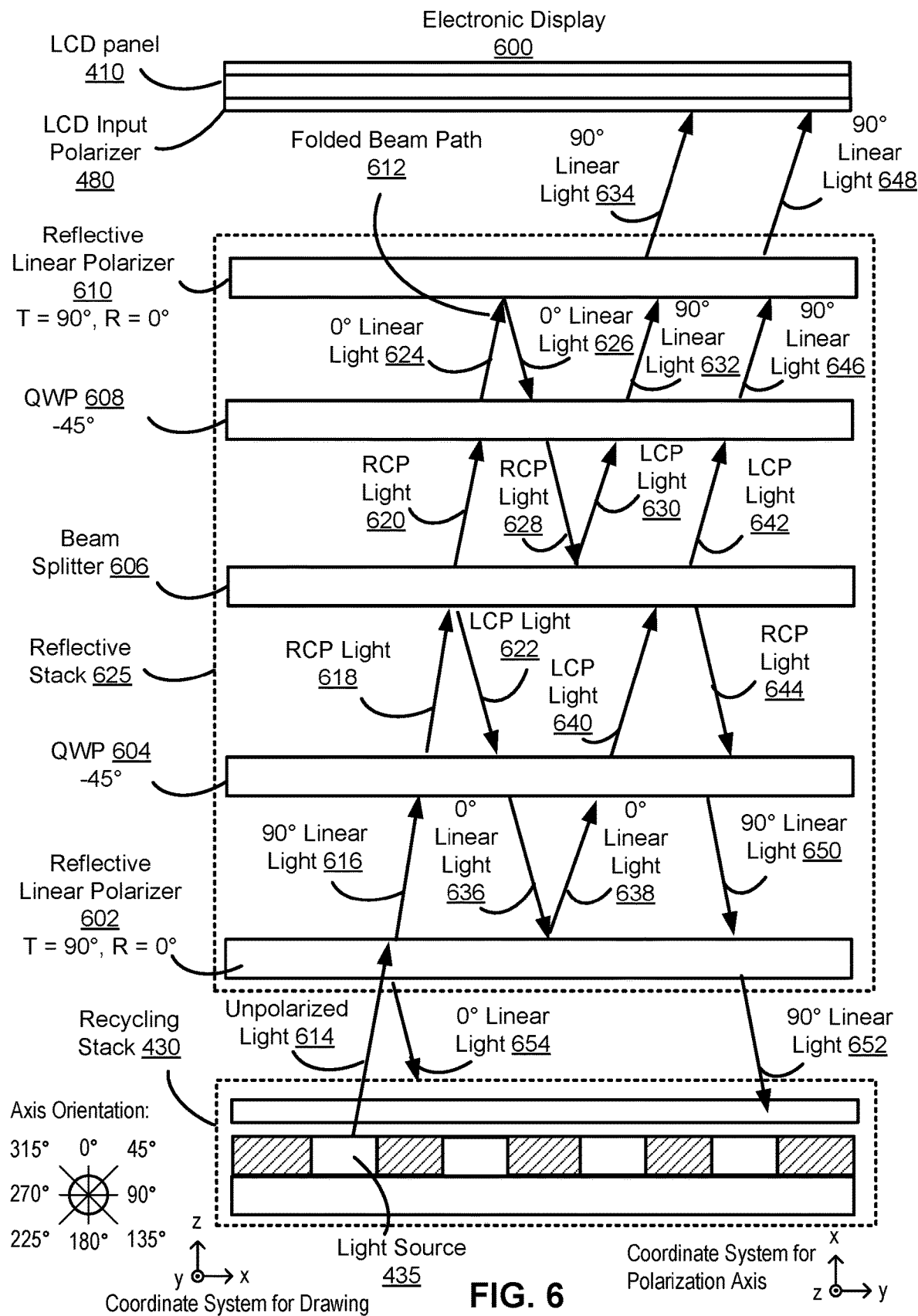

FIG. 6 shows a cross sectional side view of an electronic display 600 including a reflective stack 625, in accordance with some embodiments. The reflective stack 625 uses conversions between linear and circular polarized light to cause light emitted from light sources 435 to take a folded beam path 612 to the LCD panel 410. The electronic display 600 is an example of an electronic display 155 that can be incorporated within a HMD. The electronic display 600 includes an LCD panel 410 and a backlight including the reflective stack 625, recycling stack 430, and light sources 435.

The reflective stack 625 includes a reflective linear polarizer 602, a quarter wave plate (QWP) 604, a beam splitter 606, a QWP 608, and a reflective linear polarizer 610. The discussion above regarding the reflective linear polarizer 502 is applicable to the reflective linear polarizers 602 and 610, and the discussion above regarding the beam splitter 504/506 may be applicable to the beam splitter 606. The quarter wave plates 604 and 608 convert incident linearly polarized light into circularly polarized light, and convert incident circularly polarized light into linearly polarized light. The QWPs 604 and 608 have an optic axis at plus or minus 45 degrees relative to the polarization axis of the reflective linear polarizer 602. The orientation of the optic axis relative to the orientation of incident linearly polarized light controls the handedness of the emitted circularly polarized light. Similarly, the handedness of incident circularly polarized light controls orientation of linearly polarized light output by the QWPs 304 and 308.

The optical elements of the reflective stack 625 causes incident unpolarized light from the light sources 435 to take the folded beam path 612 to the LCD input polarizer 480 of the LCD panel 410. The reflective stack 625 also converts the incident unpolarized light into linearly polarized light having an electric field component aligned with the polarization axis the LCD input polarizer 480. The light source 435 emits unpolarized light 614, which passes through the recycling stack 430 as unpolarized light to the reflective, and to the reflective linear polarizer 602. The reflective linear polarizer 602 has a polarization axis aligned with the polarization axis the LCD input polarizer 480, which in this example is at 90 degrees. The reflective linear polarizer 602 transmits linearly polarized light 616 having an electric field component aligned along 90 degrees in a direction towards the QWP 604. The reflective linear polarizer 602 reflects linearly polarized light 654 having an electric field component aligned at 0 degrees (orthogonal to 90 degrees) in a direction away from the LCD panel 410 and towards the recycling stack 430.

The QWP 604 receives the linearly polarized light 616 having the electrical field component aligned along 90 degrees from the reflective linear polarizer 602. The optic axis of the QWP 604 is at −45 degrees relative to the orientation of the linearly polarized light 616, which results in the QWP 604 converting the linearly polarized light 616 into right circularly polarized (RCP) light 618. The QWP 604 directs the RPC light 618 toward the beam splitter 606.

The beam splitter 606 receives the RCP light 618, and converts the light into RCP light 620 directed towards the QWP 608, and left circularly polarized (LCP) light 622 directed away from the LCD panel 410 toward the beam splitter 606. The LCP light 622 is a portion of the RCP light 618 that is reflected by the beam splitter 606, which causes a change from right to left circular polarization.

The QWP 608 receives the RCP light 620, and converts the RCP light 620 into linearly polarized light 624 having an electric field component aligned along 0 degrees. The QWP 608 transmits the linearly polarized light 624 towards the reflective linear polarizer 610.

The reflective linear polarizer 610 has a polarization axis aligned with the polarization axis of the LCD input polarizer 480. If the polarization axis is aligned along 90 degrees, then the reflective linear polarizer 610 transmits linearly polarized light aligned at 90 degrees and reflects linearly polarized light aligned at 0 degrees. The reflective linear polarizer 602 receives the linearly polarized light 624 having the electric field component aligned along 0 degrees, and reflects a linearly polarized light 626 having an electric field component aligned at 0 degrees in a direction away from the LCD panel 410 and towards QWP 608.

The QWP 608 receives the linearly polarized light 626, and converts the linear polarized light 626 into RCP light 628. The QWP 608 transmits the RCP light 628 towards the beam splitter 606.

The beam splitter 606 receives the RCP light 628, and converts the light into LCP light 630 directed toward the QWP 608, and a RCP light component (not shown) directed away from the LCD panel 410. The QWP 608 converts the LCP light 630 into linearly polarized light 632 having an electric field component aligned along 90 degrees. The QWP 608 directs the linear polarized light 632 towards the reflective linear polarizer 610. The orientation of the linearly polarized light 632 causes the linearly polarized light 632 to be transmitted through the reflective linear polarizer 610 as linearly polarized light 634. The linearly polarized light 634 has an electrical field component aligned along 90 degrees, which matches the orientation of the polarization axis of the LCD input polarizer 480.

Returning to the LCP light 622, the QWP 604 receives the LCP light 622 from the beam splitter 606, and converts the LCP light 622 into linearly polarized light 636 having an electric field aligned along 0 degrees. The reflective linear polarizer 602 receives the linearly polarized light 636, and reflects linearly polarized light 638 towards the QWP 604. The linearly polarized light 636 is tangential to the polarization axis of the reflective linear polarizer 602, and thus the reflective linear polarizer 602 reflects the linearly polarized light 638 towards the QWP 604.

The QWP 604 converts the linearly polarized light 638 into LCP light 640. The LCP light 640 is transmitted to the beam splitter 606, which converts the light into LCP light 642 directed toward the QWP 608, and RCP light 644 directed away from the LCD panel 410 toward the QWP 604. The QWP 608 converts the LCP light 642 into linearly polarized light 646 having an electric field component aligned along 90 degrees. The reflective polarizer 610 transmits the linearly polarized light 646 as the linearly polarized light 648. The linearly polarized light 648 has an electrical field component aligned along 90 degrees, which matches the orientation of the polarization axis of the LCD input polarizer 480.

Returning to the RCP light 644, the QWP 604 converts the RCP light 644 into linearly polarized light 650 having an electric field component aligned along 90 degrees. The linearly polarized light 650 is transmitted through the reflective polarizer 602, and toward the recycling stack 430 as linearly polarized light 652 having an electric field component aligned along 90 degrees.

In some embodiments, the reflective linear polarizer 602, beam splitter 606, and reflective linear polarizer 610 of the reflective stack 625 each transmit approximately half of the power of incident light. The QWPs 604 and 608 transmit substantially all the power of incident light. If the unpolarized light 614 from a light source 435 has a power P, then the linearly polarized light 616 has a power 0.5 P, the linearly polarized light 654 has a power 0.5 P, the RCP light 618 has a power 0.5 P, the RCP light 620 has a power 0.25 P, the LCP light 622 has a power 0.25 P, the linearly polarized light 624 has a power 0.25 P, the linearly polarized light 626 has a power 0.25 P, the RCP light 628 has a power 0.25 P, the LCP light 630 has a power 0.125 P, the linearly polarized light 632 has a power 0.125 P, the linearly polarized light 634 has a power 0.125 P, the linearly polarized light 636 has a power 0.25 P, the linearly polarized light 638 has a power 0.25 P, the LCP light 640 has a power 0.25 P, the LCP light 642 has a power 0.125 P, the linearly polarized light 646 has a power 0.125 P, the linearly polarized light 648 has a power 0.125 P, the RCP light 644 has a power 0.125 P, the linearly polarized light 650 has a power 0.125 P, and the linearly polarized light 652 has a power 0.125 P. A first order estimate of net power to the LCD input polarizer 480 from the reflective stack 625 (including light contributions from the recycling stack 435 as discussed in connection with FIG. 7) is 0.375 P.

Figure 7:
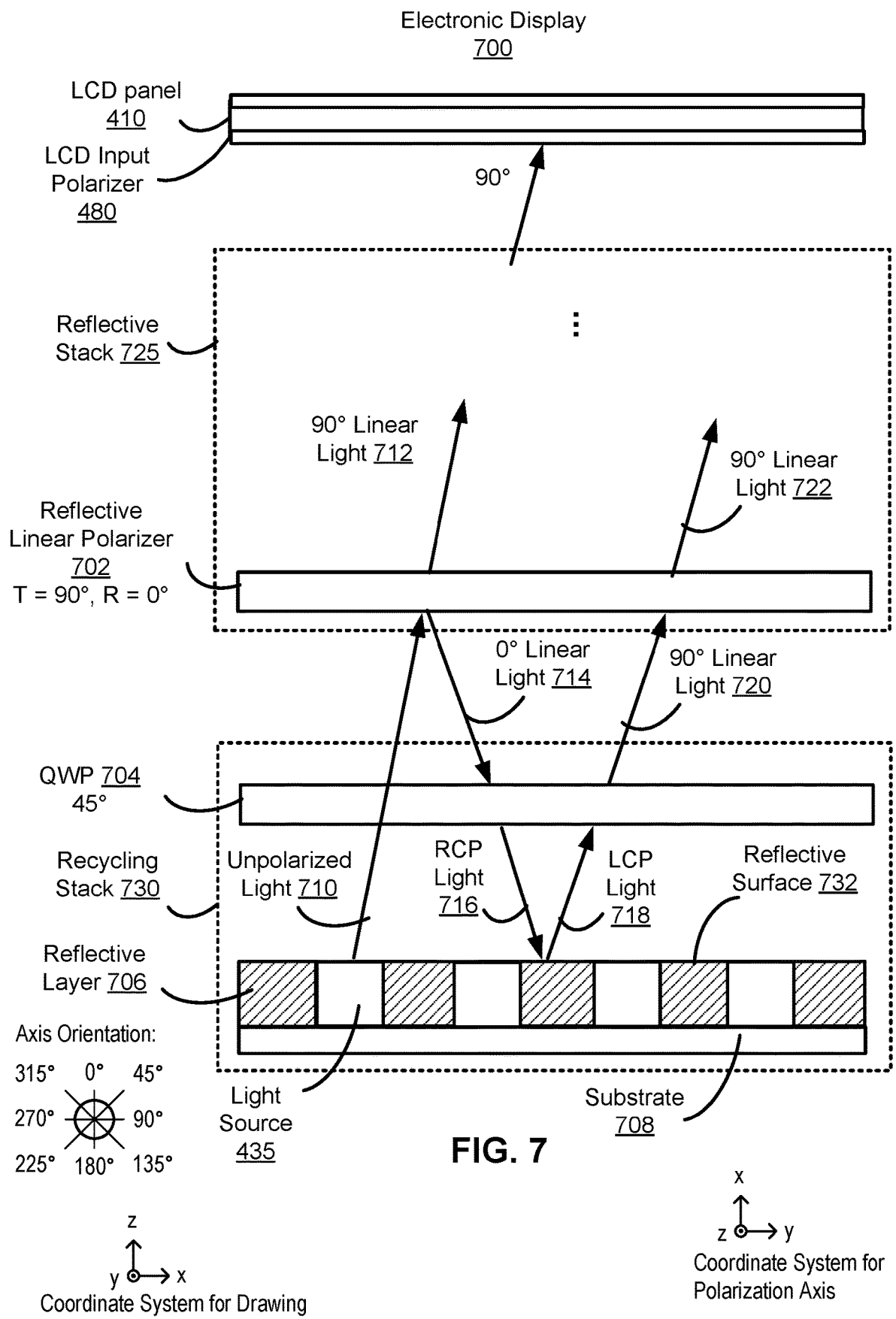

FIG. 7 shows a cross sectional side view of an electronic display 700 including a recycling stack 730, in accordance with some embodiments. The electronic display 730 includes the recycling stack, a reflective stack 725, and the LCD panel 410. The recycling stack 730 includes a QWP 704, a substrate 708, light sources 435, and a reflective layer 706. The reflective stack 725 may be the reflective stack 525 or 625 respectively shown in FIGS. 5 and 6. In either case, the reflective stack 725 includes a reflective linear polarizer 702 having a polarization axis aligned with the polarization axis of the LCD input polarizer 480. In other embodiments, the reflective linear polarizer 702 has a polarization axis that is not aligned with the polarization axis of the LCD input polarizer 480, but other optical elements of the reflective stack convert the light such that the output light is aligned with the polarization axis of the LCD input polarizer 480. If the axes of the optical elements of the reflective stack 725 are aligned as shown in FIG. 5 or 6, for example, then the QWP 704 has an optic axis aligned at −45 degrees relative to the polarization axis of the reflective linear polarizer 702.

A matrix of light sources 435 are positioned on the substrate 708. The substrate 708 may be a semiconductor layer or printed circuit board (PCB) that provides electrical connections between the light sources 435 and the controller 440. The reflective layer 706 is disposed in gaps formed between adjacent light sources 435 to provide a reflective surface 732. The light sources 435 may be LEDs that also include reflective light emitting surfaces. In some embodiments, the LEDs may include a dielectric coating at non-emitting regions. Example dielectrics may include titanium dioxide, aluminum oxide, tantalum pentoxide, and magnesium fluoride. The reflective layer 706 and the light emitting surfaces of the matrix of light sources 435 collectively form the reflective surface 732. Although shown as being a distance away from the reflective layer 706 and light sources 435, the QWP 704 may be on optical layer positioned or formed on the reflective surface 732.

The light source 435 emits an unpolarized light 710, which is transmitted through the QWP 704 to the reflective linear polarizer 702. As discussed above, the reflective linear polarizer 702 transmits linearly polarized light 712 having an electric field component aligned along 90 degrees in a direction towards the LCD panel 410. The reflective linear polarizer 702 reflects linearly polarized light 714 having an electric field component aligned at 0 degrees (orthogonal to 90 degrees) towards the QWP 704 of the recycling stack 730. The linearly polarized light 712 is transmitted through the other optical elements of the reflective stack 725 and output to the LCD input polarizer 480.

The linearly polarized light 714 that is reflected from the reflective stack 725 is recycled back to the reflective stack 725 by the recycling stack 730. The QWP 704 converts the linearly polarized light 714 into RCP light 716. The reflective surface 732 reflects the RCP light 716 into LCP light 718. The QWP 704 converts the LCP light 718 into linearly polarized light 720 having an electric field component aligned along 90 degrees, which results in the linearly polarized light 720 being transmitted through the reflective linear polarizer 702 as linearly polarized light 722. Like the linearly polarized light 712, the linearly polarized light 722 has an electric field component aligned along 90 degrees, and thus the linearly polarized light 722 is also transmitted through the other optical elements of the reflective stack 725 and output to the LCD input polarizer 480.

In some embodiments, the QWP 704 transmits light and the reflective surface 732 reflects light at substantially full power efficiency. As such, if the unpolarized light 710 from a light source 435 has a power P, then the linearly polarized light 715 has a power 0.5 P, the RCP light 716 has a power 0.5 P, the LCP light 718 has a power 0.5 P, and the linearly polarized light 720 has a power 0.5 P.

Figure 8:
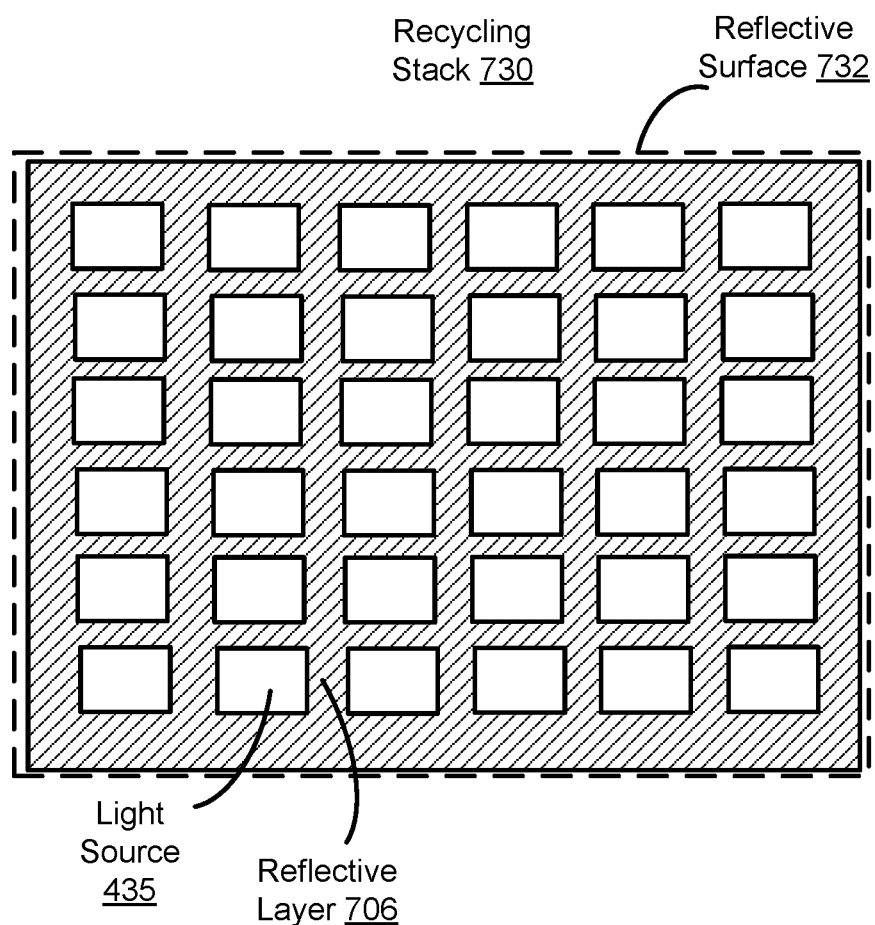
FIG. 8 shows a planar top view of a recycling stack, in accordance with some embodiments.

FIG. 8 shows a planar top view of the recycling stack 730, in accordance with some embodiments. The recycling stack includes a matrix of light sources 435. The reflective layer 706 is disposed at gaps defined between adjacent light sources 435. The reflective layer 706 may also be present at peripheries of the recycling stack outside of the matrix the light sources 435. The light sources 435 and reflective layer 706 provide the reflective surface 732 to reflect the light from a reflective stack back towards the reflective stack and along the folded beam path to the LCD panel.

ADDITIONAL CONFIGURATION INFORMATION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A backlight for illuminating a liquid crystal display (LCD) panel, comprising:
   a plurality of light sources configured to emit light; and
   a reflective stack including a plurality of optical elements providing a folded beam path for the light emitted from the plurality of light sources to the LCD panel, the light emitted from the plurality of light sources diffused while propagating towards and away from the LCD panel along the folded beam path, the plurality of optical elements including:
  a reflective linear polarizer to receive the light emitted from the plurality of light sources;
  a first nonpolarizing beam splitter positioned to receive a portion of the light from the reflective linear polarizer; and
  a second nonpolarizing beam splitter positioned to receive the portion of the light from the first nonpolarizing beam splitter, the portion of the light being reflected by the second nonpolarizing beam splitter to the first nonpolarizing beam splitter, the portion of the light reflected to the first nonpolarizing beam splitter being reflected by the first nonpolarizing beam splitter to the second nonpolarizing beam splitter and transmitted to the LCD panel.

2. The backlight of claim 1, wherein:
the reflective stack reflects another portion of the light emitted from the plurality of light sources to the LCD panel; and
the backlight further includes a recycling stack reflecting back the other portion of the light received from the reflective stack towards the reflective stack and along the folded beam path.

3. A liquid crystal display (LCD) device, comprising:
a LCD panel; and
a backlight to provide light to the LCD panel, including:
  a plurality of light sources configured to emit the light; and
  a reflective stack positioned to receive the light emitted from the plurality of light sources and transmit the light toward the LCD panel, the reflective stack including a plurality of optical elements providing a folded beam path for the light emitted from the plurality of light sources to the LCD panel, the light emitted from the plurality of light sources diffused while propagating towards and away from the LCD panel along the folded beam path, the plurality of optical elements including:
    a reflective linear polarizer to receive the light emitted from the plurality of light sources;
    a first nonpolarizing beam splitter positioned to receive a portion of the light from the reflective linear polarizer; and
    a second nonpolarizing beam splitter positioned to receive the portion of the light from the first nonpolarizing beam splitter, the portion of the light being reflected by the second nonpolarizing beam splitter to the first nonpolarizing beam splitter, the portion of the light reflected to the first nonpolarizing beam splitter being reflected by the first nonpolarizing beam splitter to the second nonpolarizing beam splitter and transmitted to the LCD panel.

4. The LCD device of claim 3, wherein:
the reflective linear polarizer reflects another portion of the light emitted from the plurality of light sources to the LCD panel; and
the backlight further includes a recycling stack positioned to receive the other portion of the light from the reflective stack, the recycling stack reflecting back the other portion of the light received from the reflective stack towards the reflective stack, the other portion of the light from the recycling stack propagating towards the reflective stack and to the LCD panel.

5. The LCD device of claim 4, wherein the recycling stack includes:
a substrate;
the plurality of light sources including a matrix of light sources disposed on the substrate;
a reflective layer disposed between adjacent light sources of the matrix of light sources, the reflective layer and light emitting surfaces of the matrix of light sources forming a reflective surface; and
a quarter wave plate (QWP) positioned between the reflective surface and the reflective stack.

6. The LCD device of claim 4, wherein the reflective stack and the recycling stack are separated by an air gap.

7. The LCD device of claim 3, wherein:
the LCD panel includes an input polarizer having a first polarization axis; and
the reflective linear polarizer has a second polarization axis that is aligned along the first polarization axis.

8. The LCD device of claim 3, wherein the diffused light emitted from the reflective stack has a larger beam width than the light emitted from the plurality of light sources.

9. A head-mounted display (HMD), comprising:
a liquid crystal display (LCD) device, including:
  a LCD panel; and
  a backlight positioned to provide light to the LCD panel, including:
    a plurality of light sources configured to emit the light; and
    a reflective stack positioned to receive the light emitted from the plurality of light sources and transmit the light toward the LCD panel, the reflective stack including a plurality of optical elements providing a folded beam path for the light emitted from the plurality of light sources to the LCD panel, the light emitted from the plurality of light sources diffused while propagating towards and away from the LCD panel along the folded beam path, the plurality of optical elements including:
      a reflective linear polarizer to receive the light emitted from the plurality of light sources;
      a first nonpolarizing beam splitter positioned to receive a portion of the light from the reflective linear polarizer; and
      a second nonpolarizing beam splitter positioned to receive the portion of the light from the first nonpolarizing beam splitter, the portion of the light being reflected by the second nonpolarizing beam splitter to the first nonpolarizing beam splitter, the portion of the light reflected to the first nonpolarizing beam splitter being reflected by the first nonpolarizing beam splitter to the second nonpolarizing beam splitter and transmitted to the LCD panel.

10. The HMD of claim 9, wherein:
the reflective linear polarizer reflects another portion of the light emitted from the plurality of light sources to the LCD panel; and
the backlight further includes a recycling stack disposed behind the reflective stack, the recycling stack reflecting back the other portion of the light received from the reflective stack towards the reflective stack, the other portion of the light from the recycling stack propagating towards the reflective stack and to the LCD panel.

11. The HMD of claim 10, wherein the recycling stack includes:

a substrate;

the plurality of light sources including a matrix of light sources disposed on the substrate;

a reflective layer disposed between adjacent light sources of the matrix of light sources, the reflective layer and light emitting surfaces of the matrix of light sources forming a reflective surface; and a quarter wave plate (QWP) positioned between the reflective surface and the reflective stack.

12. The HMD of claim 10, wherein the reflective stack and the recycling stack are separated by an air gap.

13. The HMD of claim 9, wherein:

the LCD panel includes an input polarizer having a first polarization axis; and the reflective linear polarizer has a second polarization axis that is aligned along the first polarization axis.

14. The HMD of claim 9, wherein the diffused light emitted from the reflective stack has a larger beam width than the light emitted from the plurality of light sources.

\* \* \* \* \*